(12) United States Patent
Tucker et al.

(10) Patent No.: US 7,306,333 B2
(45) Date of Patent: Dec. 11, 2007

(54) COLORED CONTACT LENSES FOR ENHANCING A WEARER'S NATURAL EYE COLOR

(75) Inventors: Robert Carey Tucker, Suwanee, GA (US); Barry L. Atkins, Chicago, IL (US); Sandra Corti, Suwanee, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/305,692

(22) Filed: Dec. 16, 2005

(65) Prior Publication Data

US 2006/0181676 A1 Aug. 17, 2006

Related U.S. Application Data

(60) Provisional application No. 60/636,930, filed on Dec. 17, 2004.

(51) Int. Cl.
*G02C 7/04* (2006.01)
(52) U.S. Cl. ........................................ 351/162; 351/177
(58) Field of Classification Search ................ 351/162, 351/177
See application file for complete search history.

(56) References Cited

U.S. PATENT DOCUMENTS 5,260,727 A * 11/1993 Oksman et al. ............. 351/162

| | | | |
|---|---|---|---|
| 2002/0080327 A1 | 6/2002 | Clark et al. ................... 351/162 |
| 2002/0191152 A1 | 12/2002 | Hsu ............................. 351/162 |
| 2003/0025872 A1 | 2/2003 | Ocampo ....................... 351/162 |
| 2003/0117576 A1* | 6/2003 | Thakrar et al. .............. 351/162 |
| 2003/0227596 A1 | 12/2003 | Clark et al. ................... 351/162 |

FOREIGN PATENT DOCUMENTS

WO WO 02/057837 7/2002
WO WO 2005/112579 12/2005

OTHER PUBLICATIONS

International Search Report.

* cited by examiner

*Primary Examiner*—Scott J. Sugarman
*Assistant Examiner*—Darryl Collins
(74) *Attorney, Agent, or Firm*—Jian Zhou

(57) ABSTRACT

The invention is directed to a colored contact lens designed for enhancing a wearer's eye color while giving the wearer's eyes a very natural appearance. A colored contact lens of the invention comprises a colored central zone which includes a colored substantially-circular pattern composed of non-opaque colored dots. Sizes of the dots and/or amounts of space between the dots are varied in a radially-controlled manner so that local colored dot coverage increases in a radial direction from the center to the peripheral edge or a position near the peripheral edge of the substantially-circular pattern.

52 Claims, 9 Drawing Sheets

B

A

A

B

A

B

COLORED CONTACT LENSES FOR ENHANCING A WEARER'S NATURAL EYE COLOR

This application claims the benefit under 35 USC § 119 (e) of U.S. provisional application No. 60/636,930 filed Dec. 17, 2004, incorporated herein by reference in its entirety.

The present invention relates to colored contact lenses for enhancing a wearer's natural eye color, and in particular to color contact lenses capable of making subtle changes to the color of the human eye and thereby enhancing the color of the eyes of the light-eyed person while maintaining a natural appearance. The present invention also relates to methods for designing and manufacturing colored contact lenses of the invention.

BACKGROUND OF THE INVENTION

For cosmetic purposes, colored contact lenses having one or more colorants dispersed in the lens or printed on the lens are in high demand. These colored contact lenses enhance the natural beauty of the eye, or provide unique patterns on the iris of the wearer, or provide non cosmetic patterns.

In general, there are two types of colored contact lenses. The first are contact lenses which use essentially transparent enhancement colors that allow the color of the natural iris to show through but combine with that natural color to produce a new appearance. Such tinted lenses are typically used to turn a light eye (e.g., green) to a slightly different hue (e.g., aqua). This class of colored lenses may not be able to change an underlying dark colored, brown iris to blue. The second category is the class of opaque colored lenses having a continuous opaque pattern that fully covers the iris or having an intermittent opaque pattern that does not fully cover the iris. Opaque colored contact lenses can effectively and substantially modify the wearer's eye color.

Over the years many attempts have been made to enhance the color of one's eyes using colored contact lenses with varying degrees of success (see, for example, U.S. Pat. Nos. 4,634,449, 4,954,132, 5,793,466). Generally, at least one of the following approaches have been employed in making colored lenses for color enhancement: (1) printing a solid color disk with a transparent or translucent reactive dye on both the pupil and iris sections of a lens; (2) printing a solid color ring with a transparent or translucent reactive dye or with a translucent pigment on the iris section of a lens; (3) printing a plurality of colored lines radiating out from a circle circumscribing the pupil section of a lens; (4) tinting a lens with a tinting agent in an edge-to-edge manner; and the like. Those colored lenses do enhance the eye color of the wearer, but they may also have one or more disadvantages as follows. First, they may not achieve the strikingly natural appearance desired in the industry. Second, complete coverage of the iris and pupil limits the amount of color intensity that the lens can impart on the iris without affecting the appearance of a colored filter in the visual field. Third, printing a solid disk or annular shaped object has often proved difficult in the past, since the ink coverage may cause lens warping. Fourth, printing in or near the optical zone of a lens, especially when print quality degrades, can affect visual acuity. Fifth, they may have noticeable printing boundaries between the iris section and other sections (e.g., the pupil section and the peripheral section).

Accordingly, there are still needs for colored contact lenses that can change the hue or color intensity enough to visibly see a difference compared to the natural iris while maintaining the underlying iris structure.

SUMMARY OF THE INVENTION

It is a principal objective of this invention to provide an improved contact lens through design and application of a non-opaque colored pattern of a color, such as aqua, green, blue, or violet so as to provides a lens capable of making subtle changes or enhancements to the color of the iris of a light-eyed person wearing the lens while imparting a very natural appearance.

In one respect, the invention provides a colored contact lens comprising: a colored central zone, wherein the colored central zone includes a substantially-circular pattern of a color, wherein the substantially-circular pattern is composed of non-opaque colored dots, wherein sizes of the dots and/or amounts of space between the dots are varied in a radially-controlled manner so that local colored dot coverage increases in a radial direction from the center to the peripheral edge or a position near the peripheral edge of the substantially-circular pattern.

In another aspect, the invention encompasses a method for making a colored contact lens, comprising the steps of: applying non-opaque colored dots onto a central zone of at least one of the anterior and posterior surfaces of a contact lens to form a substantially-circular pattern of a color, wherein sizes of the dots and/or amounts of space between the dots are varied in a radially-controlled manner so that local colored dot coverage increases in a radial direction from the center to the peripheral edge or a position near the peripheral edge of the substantially-circular pattern.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Figure 1:
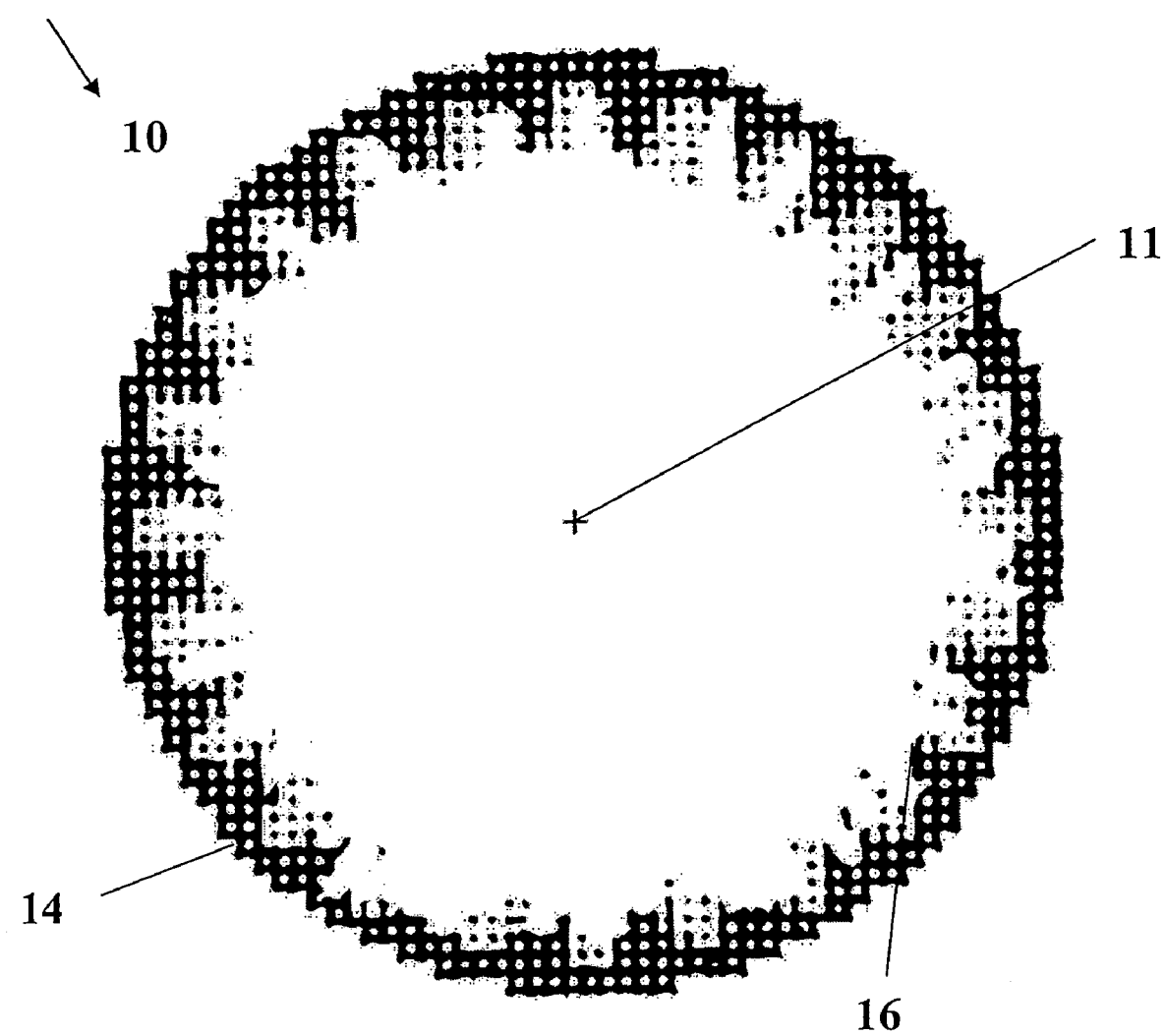
FIG. 1 illustrates a colored pattern of colored dots in accordance with an embodiment of the present invention.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact lens" refers to an object that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be tinted before printing any color patterns. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

The term "eye color" refers to the color of the iris.

The term "ordinary viewer" is intended to mean a person having normal 20/20 version standing about 5 feet from a person wearing the lenses of the invention.

The term "non-opaque" as used herein is intended to describe transparent or translucent color or a part of the lens that is uncolored or colored with transparent or translucent coloring.

A "colored coat" refers to a coating on an object and having a color image printed therein.

A "colorant" means either one or more dyes or one or more pigments or a mixture thereof that is used to print a pattern of colored elements on a contact lens.

"Dye" means a substance that is soluble in a solvent and that is used to impart color. Dyes are typically transparent or translucent and absorb but do not scatter light. Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment be heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

The term "pearlescently colored" as used herein is intended to describe an element of a colored pattern that is colored with a pearlescent colorant (i.e., containing at least one pearlescent pigment).

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

An "uneven or jagged or irregular border or peripheral edge" as used herein refers to a border or a peripheral edge on which positions have radial distances (i.e., from the lens center) which differ from each other by at least about 10%. A "substantially even border or peripheral edge" as used herein refers to a border or a peripheral edge on which positions have substantially constant radial distances (i.e., from the lens center), namely differing from each other less than 10%.

"Hydrogel" means a cross-linked polymer having an equilibrium content between about 10 and 90 percent water.

A "lens-forming material" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

The term "ethylenically unsaturated group" or "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "HEMA-based hydrogel" refers to a hydrogel obtained by copolymerization of a polymerizable composition comprising hydroxyethylmethacrylate (HEMA).

A "silicone hydrogel" refers to a hydrogel obtained by copolymerization of a polymerizable composition comprising at least one silicone-containing monomer or at least one silicone-containing macromer.

"Hydrophilic," as used herein, describes a material or portion thereof that will more readily associate with water than with lipids.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol and the like.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

As used herein, "good adhesion to a contact lens" in reference to a colored coat or film or an ink means that the colored coat or film (with a color image) generated on the lens with the ink can pass a sterilization-surviving test and at least a finger rubbing test, preferably further pass a sonication-in-methanol (or other suitable solvent, e.g., such as isopropanol) surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10×) observation of colorant bleeding, smearing, or delamination indicates failure of the rub test.

The sonication-in-methanol (or other suitable solvent, e.g., such as isopropanol) test is performed as follows. A colored contact lens is immersed in 5 ml of, for example, methanol or isopropanol or a suitable solvent, sonicated for about 1 minute and then placed in a vial containing borate buffered saline (BBS). After about 10 seconds, the saline is drained and about 5 ml of fresh BBS is added. After equilibrating for about 5 minutes in the BBS, the lens is inspected for signs of adhesion failure (e.g., colorant bleeding, smearing, or delamination).

"Passing a sterilization-surviving test" means that no significant decoloring or delamination or the like can be observed after sterilization. Production of contact lenses always involves a step of sterilization, such as autoclave, or irradiation with UV light, x-ray, or the like. For example, an autoclave-surviving test can be performed by removing a sterilized contact lens from a packaging solution, e.g., saline, and immersing it into a vial of methanol. The vial containing the hydrated contact lens and methanol is sonicated for 30 seconds using a standard laboratory sonicator. The lens is then removed from the methanol and placed back into the packaging solution. A finger rubbing test is performed on this lens. Observation of bleeding, smearing, or delamination indicates failure of this test.

A "print-on-mold process for producing colored contact lenses" refers to a process for molding a colored contact lens described in U.S. Pat. No. 5,034,166 to Rawlings et al. (herein incorporated by reference).

A "good transferability from a mold to a contact lens" in reference to an ink or a colored coat means that a color image printed on a molding surface of a mold with the ink can be transferred completely onto a contact lens cured (thermally or actinically) in that mold.

The term "surfactant," as used herein, refers to a surface-active compound as that term is well known in the art.

A "crosslinker" refers to a compound comprising two or more functional groups as they are known in the art. A crosslinker molecule can be used to crosslink two or more monomers or polymer molecules. Any known suitable crosslinkers can be used in the invention. Exemplary preferred crosslinkers include, without limitation, hexamethyl diisocyanate (HMDI), ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

A "humectant" refers to a compound that removes water (or humidity) from ink such as that term is known in the art. Examples of humectant include glycerol, ethylene glycol, diethylene glycol, and 1,3-dioxane-5,5-dimethanol. By adding one or more humectants (e.g., glycerol and diethylene glycol), clogging of the nozzles of a printer head can be minimized.

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region.

In general, the invention is directed to a colored contact lens designed for enhancing a wearer's eye color while providing a very natural appearance as perceived by the ordinary viewer.

It is discovered that such cosmetic effects (i.e., enhancing a wearer's eye color while providing a very natural appearance) can be achieved by printing, onto a central zone of at least one of the surface of a contact lens, a color disk (i.e., substantially-circular pattern of a color) with a radial gradient of color intensity in which the color intensity changes from light or transparent to dark in a radial direction from the center to the edge of the central zone. The color disk is composed of non-opaque colored dots of various sizes with varying amounts of space between them on a central zone of a contact lens. Sizes of the dots and/or amounts of space between the dots are controlled in a radially-controlled manner so that colored dot coverage increases in a radial direction from the center to the peripheral edge or a position near the peripheral edge of the color disk. There are fewer or smaller colored dots spaced far apart as approaching the center of the color disk whereas there are more or larger black dots with closer spacing when approaching the peripheral edge of the color disk. It is believed that, when looking at such a pattern of colored, the human eye averages it, producing the illusion of a radially-increased color intensity levels (i.e., which increases in a radial direction from the center to the peripheral edge or a position near the peripheral edge of the colored central zone). The color disk is printed over the central zone of a contact lens preferably using a single colorant. With such colored pattern, the iris color and texture of an eye underlying a colored contact lens of the invention can show through the colored pattern so as to appear very natural to an ordinary viewer while enhancing the eye color. In addition, when a colored contact lens of the invention further comprises a black limbal ring on the central zone near its peripheral edge, it can allow an eye to appear more "youthful" to an ordinary viewer.

There are several advantages associated with the invention. First, no demarcation between the print and the natural iris is noticeable to an ordinary viewer. Second, the print can penetrate into the pupil section (i.e., optical zone) of a lens. Third, with a colored pattern of the invention, there is practically no limit on the amount of color intensity that the lens can impart on the iris since penetration of the print into the visual field can have minimal color-filter effects on visual acuity. Fourth, either reactive dyes or pigments can be used in the present invention. Fifth, lens warping due to printing can be minimized or eliminated. Sixth, a colored pattern of the invention can allow good transition and coverage over the inner iris zone.

It is also discovered that an inversion mark and/or other marks (e.g., rotation mark, toric marks (cylindrical axis, ballast axis), SKU, UPC codes, etc.) can be embedded in a colored pattern of the invention so that the mark is noticeable to a wearer before wearing the colored lens whereas the mark is unnoticeable to an ordinary viewer when worn by a wearer. The mark can be imbedded in the colored pattern simply by adjusting locally dot density at any place where the mark is desired. By increasing local dot density, one can make a positive mark. By decreasing local dot density, one can make a negative mark. It is understood that any above-mentioned mark can be printed independently from the printing of the colored pattern of the invention as long as the mark is embedded in the colored pattern and is unnoticeable to an ordinary viewer when worn by a wearer.

In one respect, the invention provides a contact lens comprising: a colored central zone, wherein the colored central zone includes a substantially-circular pattern of a color, wherein the substantially-circular pattern is composed of non-opaque colored dots of various sizes with varying amounts of space between them, wherein sizes of the dots and/or amounts of space between the dots are varied in a radially-controlled manner so that local colored dot coverage increases in a radial direction from the center to the peripheral edge or a position near the peripheral edge of the substantially-circular pattern.

It is understood that in a substantially-circular pattern of a color of the invention two or more neighboring dots may connect with each other at a certain value of local colored dot coverage. It is also understood that there may exist some fluctuations in local colored dot coverage in a radial direction as long as the general trend in local colored dot coverage in a radial direction is increased.

As used herein, "local colored dot coverage" or "local colored dot density" or "dot coverage" or "dot density" is defined by equation (1)

$$C(x_i, y_j) = \frac{A_{dot}(x_i, y_j)}{A_{dot}(x_i, y_j) + A_{space}(x_i, y_j)} \quad (1)$$

in which $C(x_i, y_j)$ is a local colored dot coverage (or local colored dot density or dot coverage or dot density) determined within a local area with its center located at a position $(x_i, y_j)$ and with a length of $(2\Delta x)$ and a width of $(2\Delta y)$, $A_{dot}(x_i, y_j)$ is the area of dot(s) within $(2\Delta x)\cdot(2\Delta y)$, of space between dots within $2\Delta x \cdot 2\Delta y$. Equation (1) is based on Cartesian coordinate system. It should be understood that other coordinate systems, such as Polar coordinate system $(r_i, \theta_j)$, can also be used. A person skilled in the art will understood very well how to convert Polar to Cartesian coordinates or vice versa. Any known methods known to a person skilled in the art can be used to determine a local colored dot coverage. For example, one can first divide a lens surface with a colored pattern into a grid of any defined areas (e.g., $2\Delta x=2\Delta y=1$ mm), measure the area covered by dot(s) and/or dot portions within each area, and then calculate the local colored dot coverage at a position (i, j) which is the center of each area.

In accordance with the invention, space between dots can be colored with a different color or lightly tinted or preferably clear (non-color).

As well known in the art, a color is generally described mainly by the following inter-related terms: hue, chroma, intensity, saturation, luminance, brightness value and opacity.

The term "different colors" is intended to describe that two colors are different in at least one of hue, chroma, intensity, saturation, luminance, brightness value, and opacity. Such differently-colored space between dots can be achieved by printing a solid color disk prior to or posterior to printing dots. A "solid color disk" refers to a substantially circular colored pattern which is substantially free of voids (non-printed areas).

Where space between dots are differently colored (i.e., colored with a different color), the space preferably has a luminance higher than that of the colored dots, more preferably at least about 40% higher than that of the colored dots. Luminance can be determined by any methods, such as, for example, reflectance spectroscopy. Alternatively, the space between dots and colored dots are the same basic color (hue), but the space has an intensity lighter, preferably at least about 40% lighter than the dots, such as light blue (space) and dark blue (dots).

The term "lightly tinted" is intended to describe that a contact lens is tinted with a tinting agent in an edge-to-edge manner or at least in the central zone of a lens, where a substantially-circular pattern of colored dots is printed. A person skilled in the art will understood how to tint a lens, for example, by incorporating a tinting agent (a dye or a pigment) in a lens-forming material for making contact lenses.

In accordance with a preferred embodiment, a local colored dot coverage $C(x_i, y_j)$ is varied in a way that $A_{dot}(x_i, y_j)$ increases gradually whereas $A_{space}(x_i, y_j)$ decreases gradually in a radial direction (i.e., from the center to the edge of the lens). One way to achieve this effect is to fix the spacing of the center of each dot while to increase the sizes of dots located in a local area. The resulting space between the dots becomes smaller. The farther from the center a dot is located, the larger its size is. Dots located near the peripheral of a central zone of a lens can have a larger size and cover larger area, thereby causing the periphery of the central zone of the lens to appear darker than the center.

Alternatively, one can gradually increase local colored dot coverage in a radial direction (from the center to the edge or a position near the edge of the central zone) by keeping the size of each dot substantially constant while adding one or more dots in a given local area. The larger number of colored dots within an area near the periphery of a central zone of a lens causes the appearance of a darker periphery than the center of the central zone.

If a colored contact lens of the invention is a soft contact lens (i.e., made of a hydrogel or silicone hydrogel material), it also has a non-opaque peripheral zone surrounding the colored central zone.

In accordance with a preferred embodiment, the colored central zone has a profile of local colored dot coverage which can be defined by at least one mathematical function. Any mathematical functions can be used. Exemplary mathematical functions include conic functions, quadric functions, polynomials of any degree, exponential functions, trigonometric functions, hyperbolic functions, rational functions, Fourier series, wavelets, and the like. Examples of preferred mathematical function include linear functions, polynomial functions of any degree, trigonometric functions, exponential functions, hyperbolic functions, and combinations thereof.

In a preferred embodiment, the profile of local colored dot coverage is rotationally-symmetric and defined by at least one of equations (2), (3) and (4) or combinations thereof $$C(r) = b_0 + a_0 \cdot \sin\left(\frac{r}{2R}\pi\right) \quad (2)$$

$$C(r) = \sum c_j \left(\frac{r}{R}\right)^{(l+j)} \quad (3)$$

-continued $$\begin{cases} C(r) = b_1 + k_1 \dfrac{r}{R} & 0 \le r < r_1 \\ C(r) = b_2 + k_2 \dfrac{r}{R} & r_1 \le r < r_2 \\ \vdots \\ C(r) = b_i + k_i \dfrac{r}{R} & r_{i-1} \le r < r_i \\ \vdots \end{cases} \quad (4)$$

in which C(r) is a local colored dot coverage at a distance of r from the center; $a_0$, $b_i$, $c_j$, and $k_i$ are coefficients; and R is the radius of a color disk. In Cartesian coordinate system in which the center of the color disk is located at (0, 0), $r = \sqrt{x_i^2 + y_j^2}$.

In another preferred embodiment, the profile of local colored dot coverage is axial symmetric with respect to a given angle (e.g., 30°, 36°, 45°, 60°, 72°).

In accordance with the invention, colored dots can even be printed in the traditionally defined central optical zone of a lens to minimize demarcation between the print and iris and maintain the natural iris appearance to ordinary viewers. Preferably, the colored central zone comprises a small central area where there are no colored dots.

The small central area should be located concentrically with the center of the colored central zone. It can have any desirable shape. Preferably, the small central area is substantially circular in shape having a diameter of from about 0.1 mm to about 5.0 mm, preferably from about 0.5 mm to 1.5 mm, even more preferably from about 0.8 mm to about 1.2 mm.

The non-opaque colored dots can have any shape, regular or irregular, such as circular, oval, triangular, square, hexagonal, elongated, etc. All of dots can have similar or different shapes. Preferably, all dots have substantially similar shape. More preferably, all dots have circular shapes.

The range of dot diameter is preferably from 0 to about 0.2 mm. The spacing between dots is preferred from 0 to about 0.2 mm outside of the central area.

The colored central zone is preferably concentric with the center of a contact lens. The size of the colored central zone is generally large enough to cover the pupil and most or the whole iris of an eye. Preferably, the size of the colored central-zone is from about 12.4 mm to about 1.5 mm in diameter. The colored central zone can be larger than the size of iris, if desired. The colored central zone can have an uneven or substantially even border with the non-opaque peripheral zone.

It should be understood that any shape of a zone, an area, a colored pattern, or the like in reference to a contact lens intends to refer to the shape of the zone, the area, the colored pattern, or the like projected onto a plane perpendicular to an axis passing through the apex of the contact lens in normal direction.

Any colorant can be used in printing a colored pattern of the invention, as long as the colorant can provide transparent or translucent colored dots. Exemplary colorants include reactive dyes and pigments. The pigments should be small enough in size to scatter little visible light. Preferably, the size of pigment is smaller than about 1 micron.

In another preferred embodiment, the colored central zone further comprises a dark limbal ring located near the peripheral edge of the colored central zone and/or surrounding the colored pattern, wherein the limbal ring is comprised of a dark colorant, wherein the limbal ring has an interior peripheral edge and an exterior peripheral edge, wherein the exterior peripheral edge is substantially even, wherein the interior peripheral edge is uneven (or jugged or irregular) or substantially even.

The interior peripheral edge of a limbal ring refers to an edge being closest to the center of the colored central zone. The exterior peripheral edge of a limbal ring refers to an edge being farthest to the center of the colored central zone.

By having a dark-colored limbal ring on the colored central zone, a colored contact lens of the invention can allow an eye to appear more "youthful" to an ordinary viewer.

The limbal ring can be comprised of any shaped pigmented areas, preferably, non-opaque dots, which has a substantially even border with the non-opaque peripheral section. The limbal ring can have a substantially even circular border or preferably a jagged (or uneven or irregular) border with the pattern of non-opaque colored dots. Optionally, the limbal ring overlaps to some degrees with the pattern of non-opaque colored dots.

Other print layers can be added on top of or below the substantially-circular pattern of dots. Other printed layers could include patterns meant to accentuate the pupil, patterns meant to add additional colorant structures or accents to the iris, or striations meant to add texture to the iris.

FIG. 1 schematically illustrates a limbal ring 10 according to a preferred embodiment of the invention. The limbal ring is concentric with the center 11 of a lens and has a substantially even exterior peripheral edge 14 and a jagged interior peripheral edge 16. The exterior peripheral edge 14 can have a diameter of from about 12.5 mm to about 14 mm.

In accordance with the present invention, the dark colorant for printing the limbal ring can be any dark color, for example, such as dark green, dark blue, dark gray, preferably black.

Figure 2:
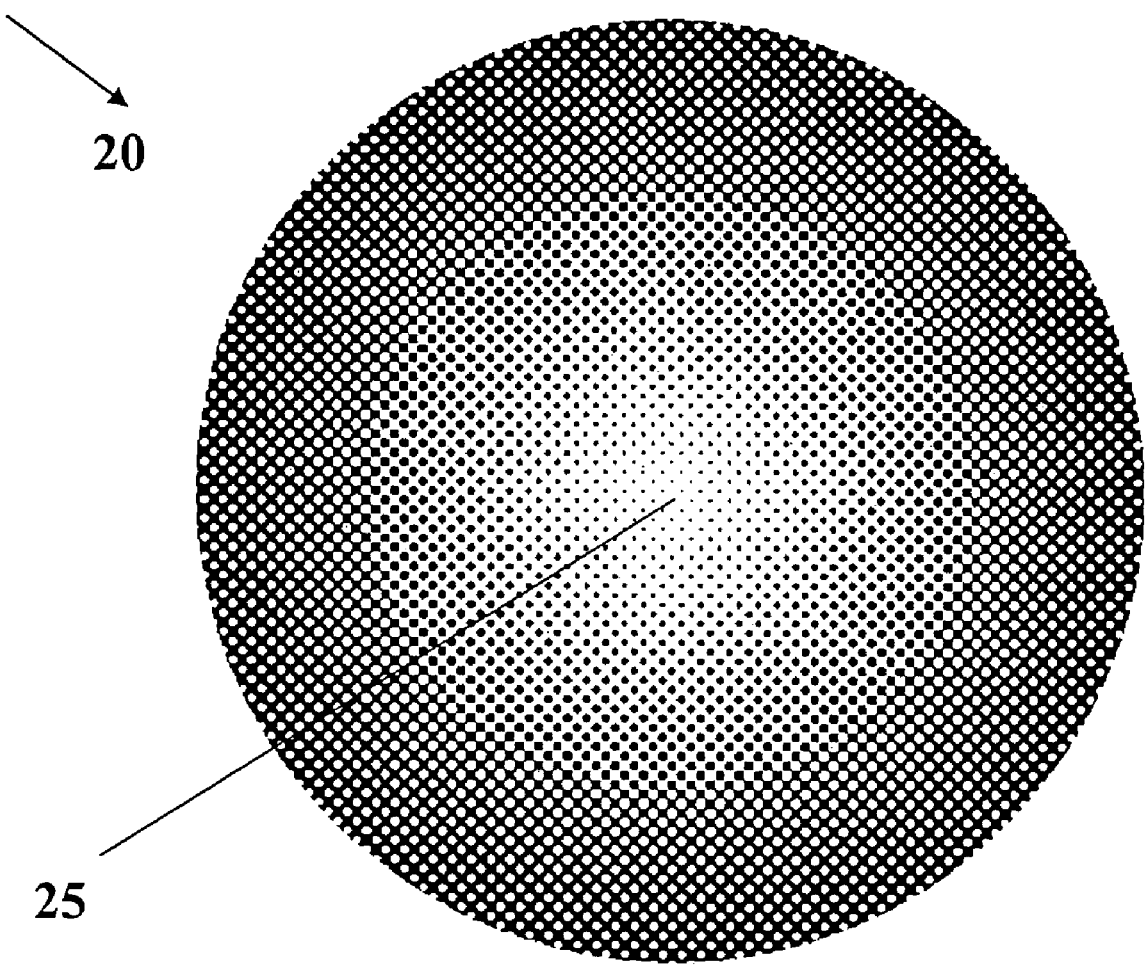
FIG. 2 illustrates a colored pattern of colored dots in accordance with an alternative embodiment of the present invention.
Figure 3:
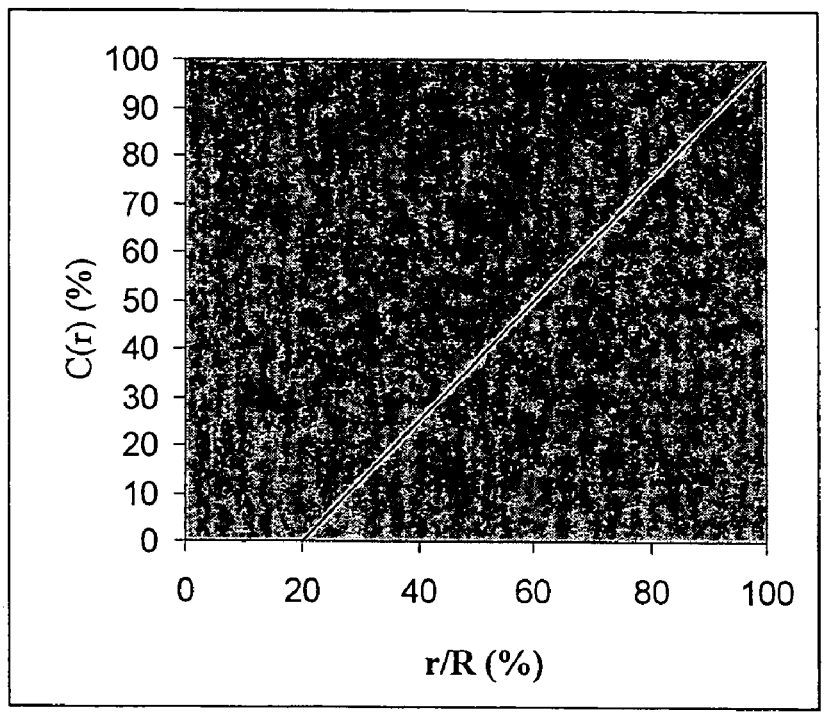
FIG. 3A illustrates a colored pattern of colored dots in accordance with an alternative embodiment of the present invention.
FIG. 3B illustrates the profile of local dot coverage of the pattern shown in FIG. 3A.
Figure 3:
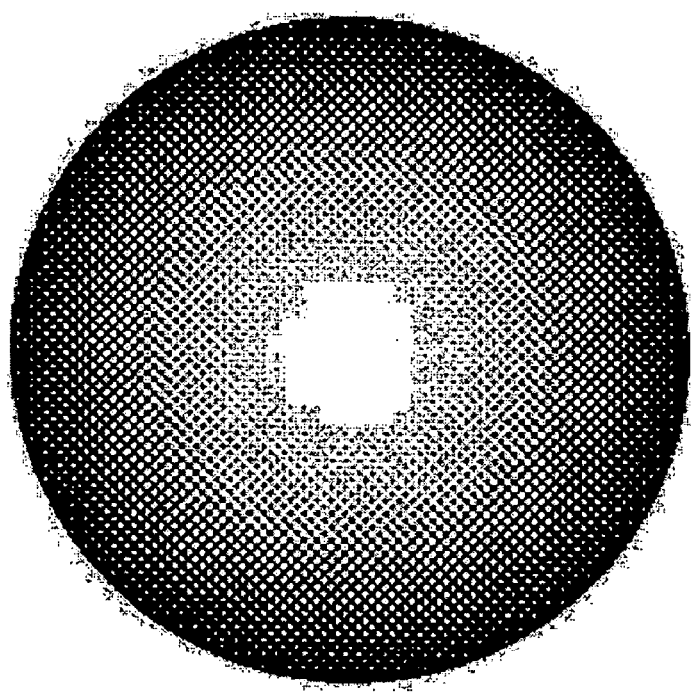
Figure 4:
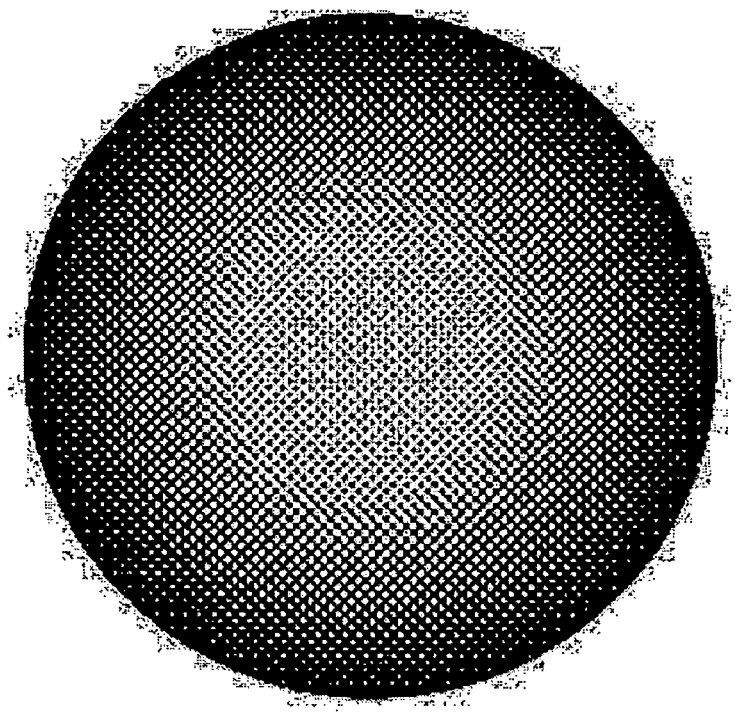
FIG. 4A illustrates a colored pattern of colored dots in accordance with an alternative embodiment of the present invention.
FIG. 4B illustrates the profile of local dot coverage of the pattern shown in FIG. 4A.
Figure 4:
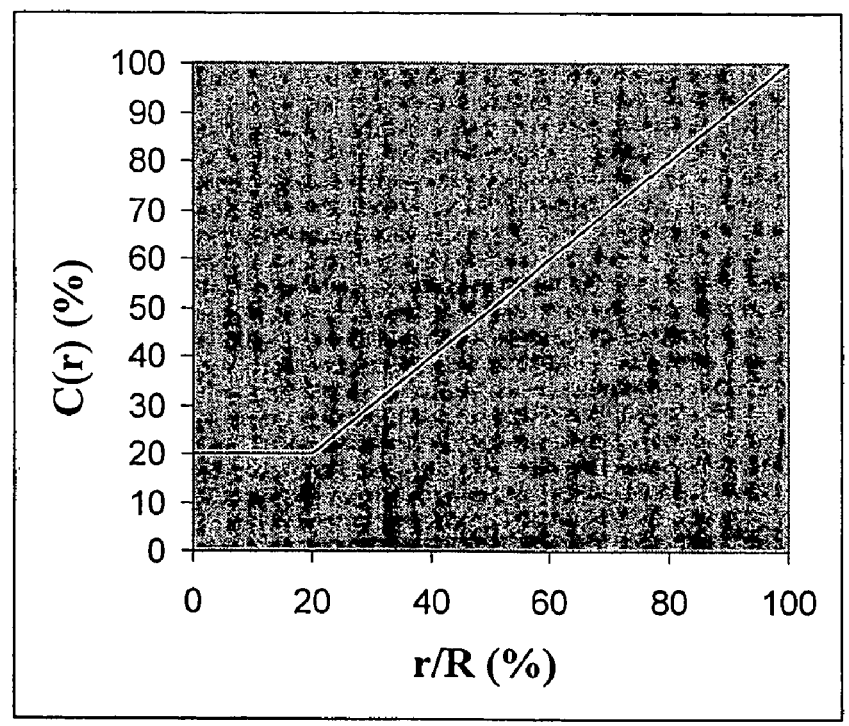

FIG. 2 schematically illustrates a substantially circular pattern 20 of non-opaque colored dots according to one preferred embodiment of the invention. The substantially circular pattern contains a clear small area 25 which is located in the center portion of the substantially circular pattern. The clear pupil area 25 is formed by removing colored dots in that area. A clear peripheral zone (not shown) surrounds the pattern 10 and is typically left uncolored because it will lay over the sclera when placed on the eye.

FIGS. 3A, 4A, 5, and 6A-7A illustrate alternative designs of a substantially circular pattern of non-opaque colored dots.

The profile of local colored dot coverage for the pattern shown in FIG. 3A has a substantially rotational-symmetry and can be defined by two equations (FIG. 3B)

$$\begin{cases} C(r) = 0 & 0 \le \dfrac{r}{R} < 0.20 \\ C(r) = -0.25 + 1.25 \dfrac{r}{R} & 0.2 \le \dfrac{r}{R} < 1.0 \end{cases} \quad \begin{array}{c}(5)\\(6)\end{array}$$

in which r is the distance from the center and R is the radius of the pattern.

The profile of local colored dot coverage for the pattern shown in FIG. 4A has a substantial rotational-symmetry and can be defined by two equations (FIG. 4B)

$$\begin{cases} C(r) = 0.2 & 0 \le \dfrac{r}{R} < 0.20 \\ C(r) = \dfrac{r}{R} & 0.2 \le \dfrac{r}{R} < 1.0 \end{cases} \quad \begin{array}{c}(7)\\(8)\end{array}$$

in which r is the distance from the center and R is the radius of the pattern.

Figure 5:
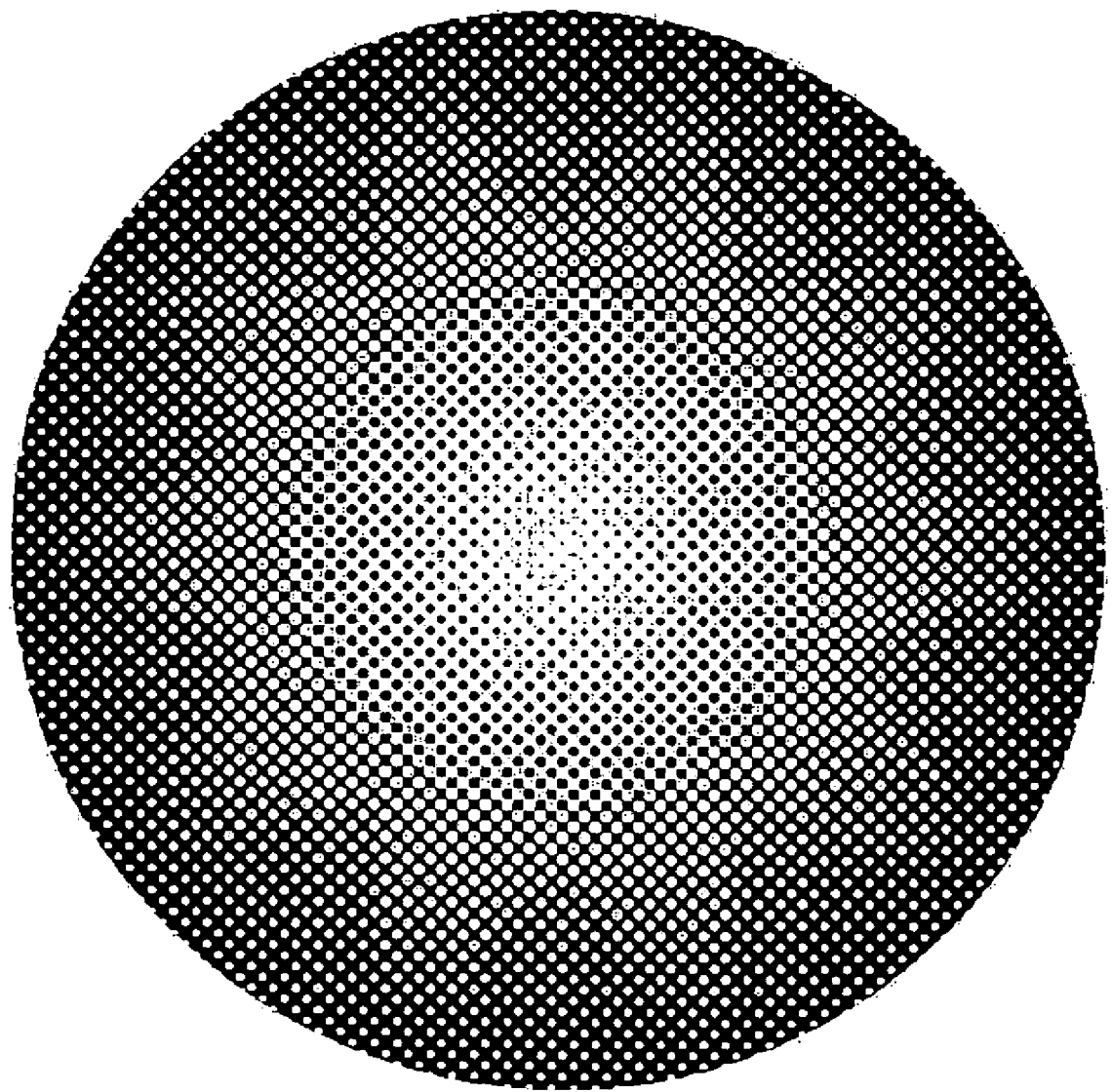
FIG. 5 illustrates a colored pattern of colored dots in accordance with an alternative embodiment of the present invention.
Figure 6:
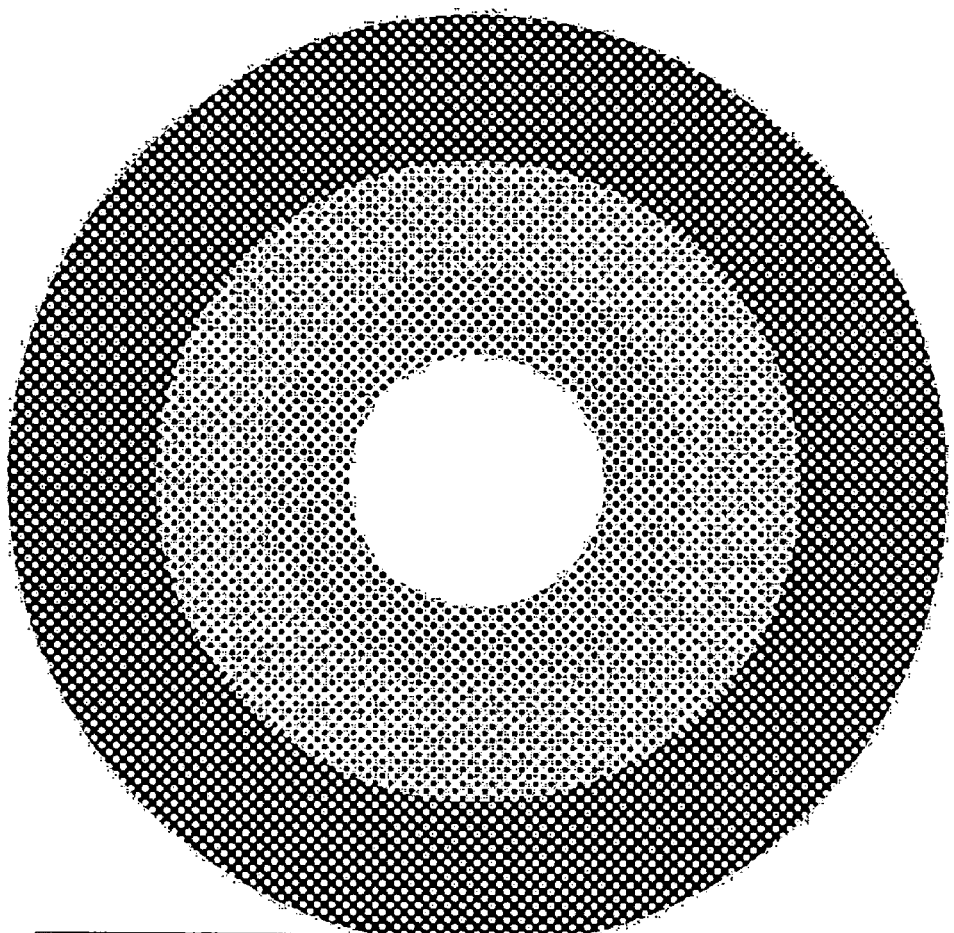
FIG. 6A illustrates a colored pattern of colored dots in accordance with an alternative embodiment of the present invention.
FIG. 6B illustrates the profile of local dot coverage of the pattern shown in FIG. 6A.
Figure 6:
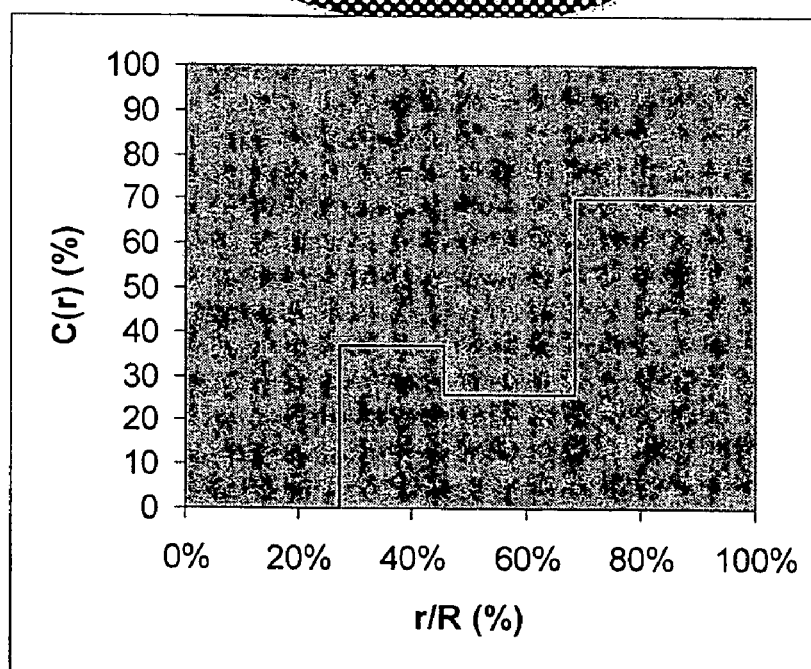
Figure 7:
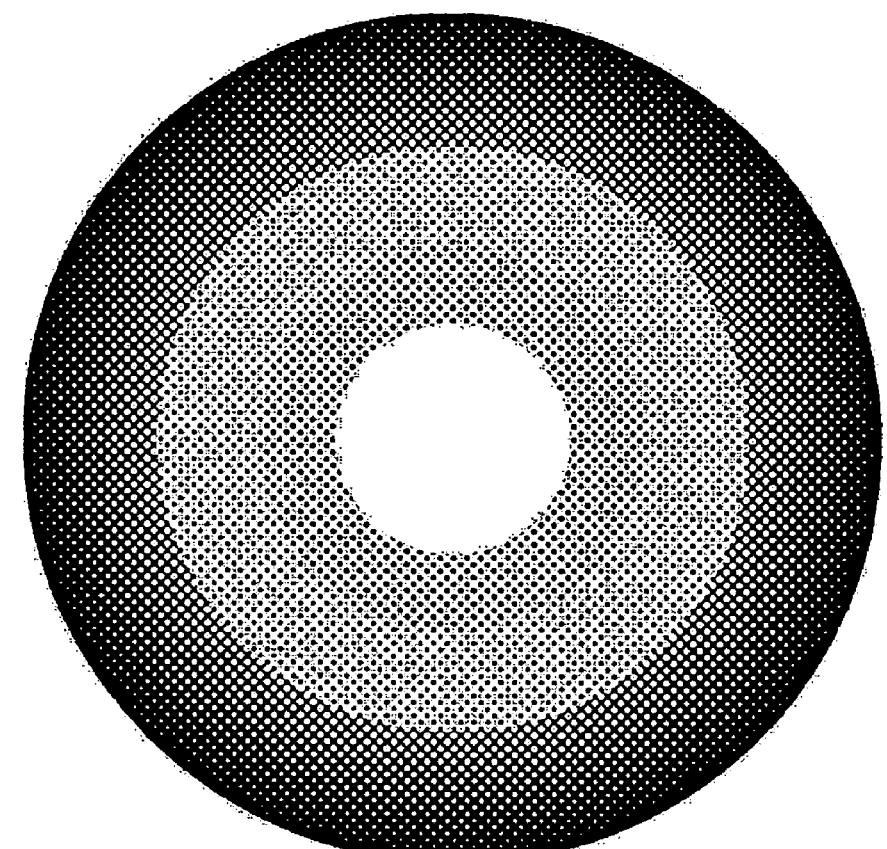
FIG. 7A illustrates a colored pattern of colored dots in accordance with an alternative embodiment of the present invention.
FIG. 7B illustrates the profile of local dot coverage of the pattern shown in FIG. 7A.
Figure 7:
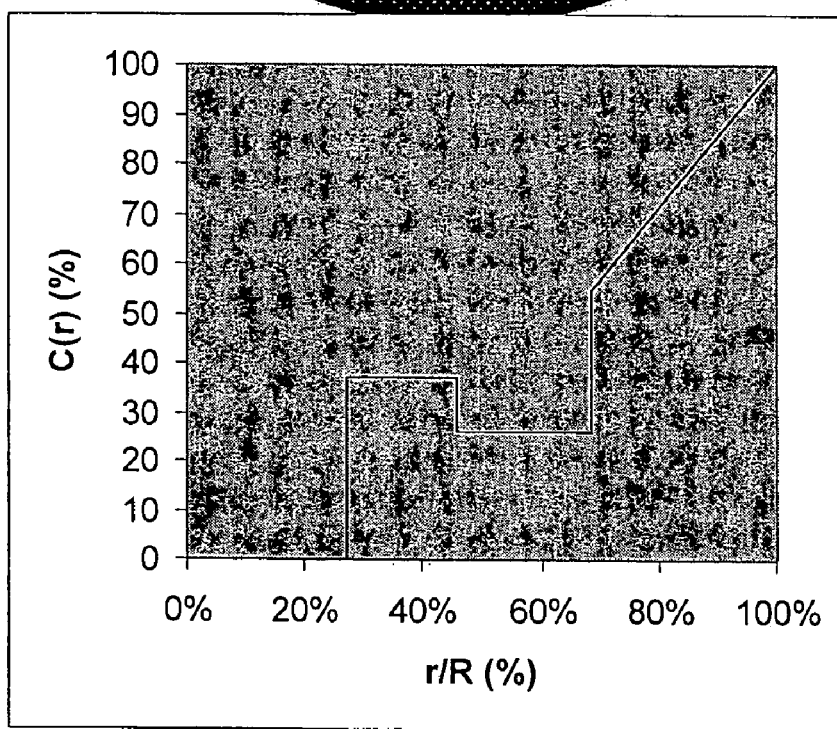
Figure 8:
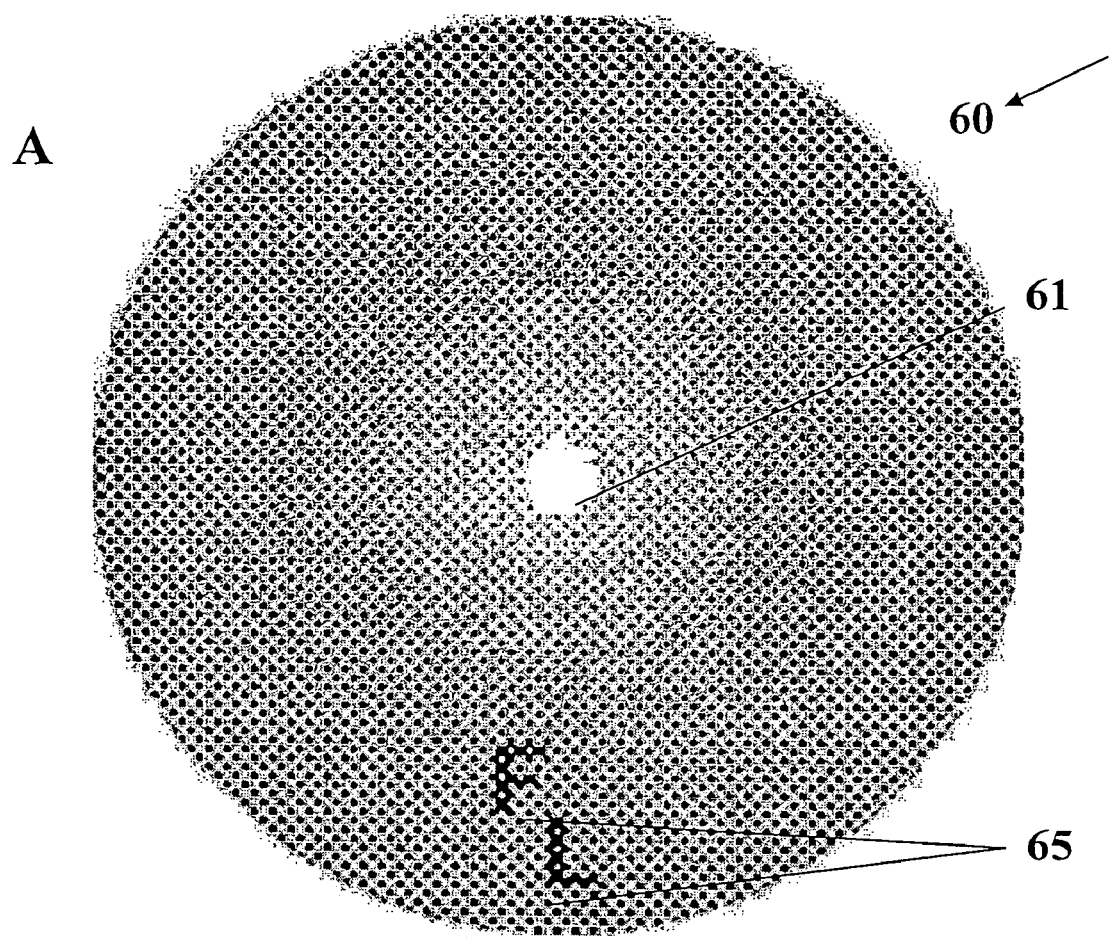
FIG. 8A illustrates a colored pattern of colored dots and an inversion mark embedded in the colored pattern in accordance with an alternative embodiment of the present invention.
FIG. 8B illustrates the profile of local dot coverage of the colored pattern shown in FIG. 8A.
Figure 8:
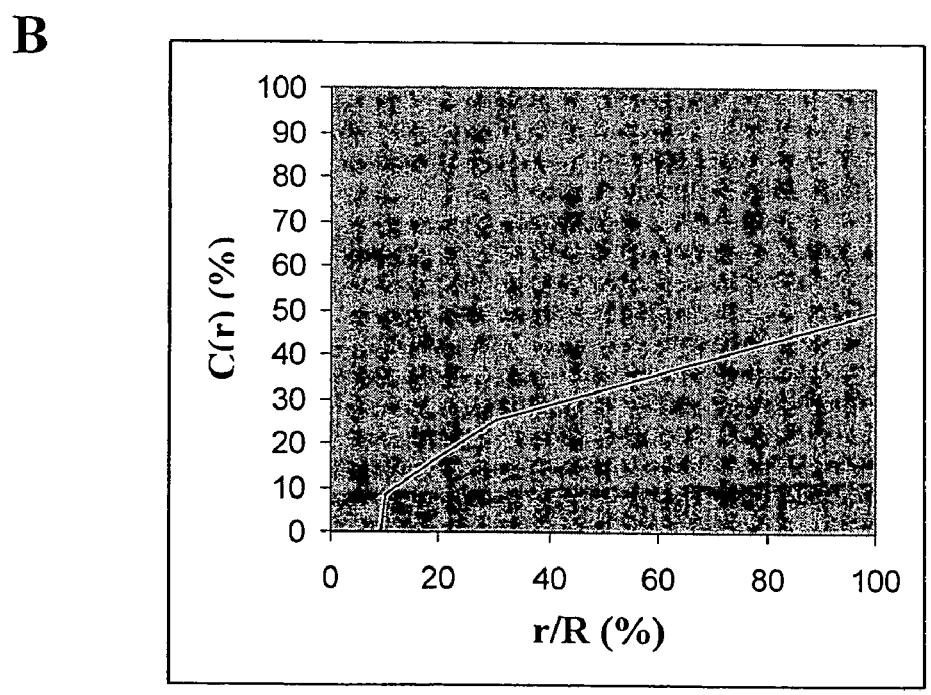
Figure 9:
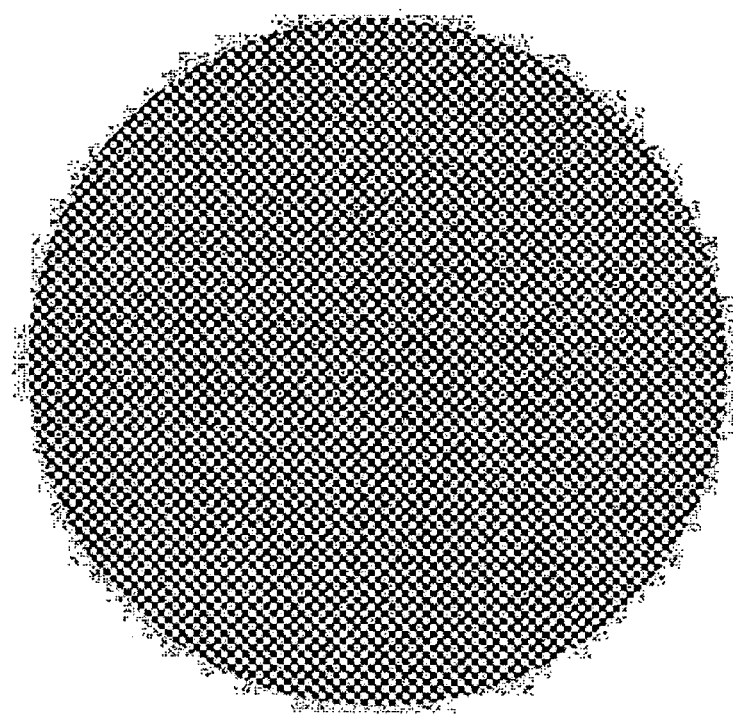
FIG. 9A illustrates a colored pattern of colored dots in accordance with an alternative embodiment of the present invention.
FIG. 9B illustrates the profile of local dot coverage of the pattern shown in FIG. 9A.
Figure 9:
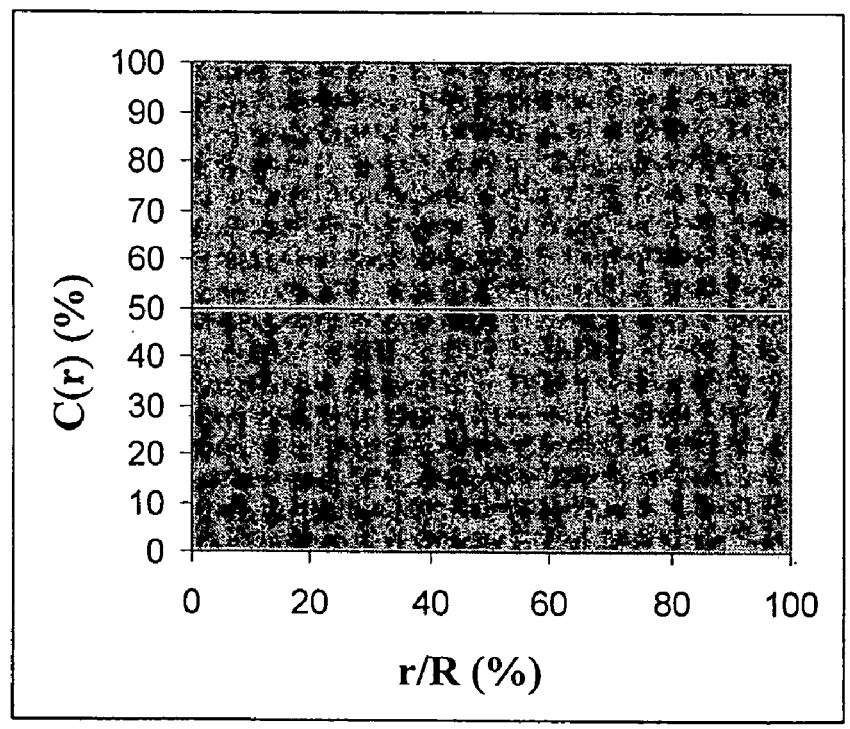

The profile of local colored dot coverage for the pattern shown in FIG. 5 has a 36° axial-symmetry (i.e., remaining rotating the pattern 36° around an axis passing through the center).

The profile of local colored dot coverage for the pattern shown in FIGS. 6A and 7A has a substantial rotational-symmetry and the relationship between local colored dot coverage and the distance from the center is shown in FIGS. 6B and 7B. In these illustrated examples, there are some fluctuations in local colored dot coverage, but the general trend is that local colored dot coverage increases as the distance from the center is increased.

Although many colors may be utilized to enhance the eye color, the particular colors used to create the subtle changes or enhancements to the eye of a light-eyed person include green, blue, aqua, violet, and yellow.

Design of a substantially-circular pattern (color disk) of a color of the invention can be carried out using any known methods and/or commercially available software (e.g., Adobe Illustrator, Adobe Photoshop, CorelDraw), preferably based on black & white halftones.

In a preferred embodiment, the colored central zone further comprises an inversion mark and/or other marks (e.g., rotation mark, toric marks (cylindrical axis, ballast axis), SKU, UPC codes, etc.) can be embedded in the colored pattern so that the those marks are noticeable to a wearer before wearing the colored lens whereas unnoticeable to an ordinary viewer when worn by a wearer.

The inversion mark and/or other marks (e.g., rotation mark, toric marks (cylindrical axis, ballast axis), SKU, UPC codes, etc.) can be imbedded in the colored pattern simply by adjusting locally dot density at any place where the mark is desired. By increasing local dot density (coverage), one can make a positive mark. By decreasing local dot density, one can make a negative mark. It is understood that an inversion mark and/or other marks (e.g., rotation mark, toric marks (cylindrical axis, ballast axis), SKU, UPC codes, etc.) can be printed independently from the printing of the colored pattern of the invention as long as the mark is embedded in the colored pattern and is unnoticeable to an ordinary viewer when worn by a wearer.

FIG. 8A shows an inversion mark 65 embedded in a substantially circular pattern 60 of colored dots. The substantially circular pattern 60 contains a clear small area 61 which is located in the center portion of the substantially circular pattern 60. The profile of local colored dot coverage for the substantially circular pattern 60 shown in FIG. 8A has a substantial rotational-symmetry and can be defined by four equations (FIG. 8B). The inversion mark 65 is positive, formed by increasing local dot density.

The central zone of a colored contact lens of the invention can optionally (but preferably does not) include one or more intermittent patterns of colored elements. The intermittent patterns has a color different from the color of the substantially-circular pattern of dots.

A colored contact lens can be made by applying an ink directly onto a preformed contact lens. A preferred method for applying an ink onto a contact lens in accordance with this invention is through printing, such as for example, pad transferring printing and/or inkjet printing using an ink, preferably a water-based ink.

An ink typically comprises at least one colorant, a binder polymer, and a solvent. An ink can optionally include a crosslinker, a humectant, a surfactant, a monomer, a polymerization initiator, an antimicrobial agent, an antioxidant agent, an anti-kogating agent, and other additives known in the art.

A colorant comprises at least one dye or preferably one pigment. Conventional and/or pearlescent pigments can be used in the invention.

A solvent can be water (water-based inks) or any appropriate organic solvent (organic solvent-based inks). Any known suitable solvents can be used, so long as they can dissolve the binder in the ink of the invention and aid in the stability of the colorant. Examples of preferred solvents include water, water mixed with one or more co-solvent, alcohols, glycols, ketones, esters, methyl ethyl ketone, cyclopentanone, and cyclohexanone.

"A binder polymer" refers to a crosslinkable polymer that comprises crosslinkable groups and can be crosslinked by a crosslinker or upon initiation by a chemical or physical means (e.g., moisture, heating, UV irradiation or the like) to trap or bind colorants onto or into a contact lens such as that term is known in the art.

The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

A binder polymer in the ink can be any polymer which is compatible with lens material. A binder polymer can be prepared by polymerization of monomers containing vinyl alcohol, vinyl butyral, vinyl acetate, acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group. Preferably, monomers used in preparing a binding polymer is the same as that for monomers used in making a lens.

An ink for printing a colored lens of the invention can be prepared according any known suitable methods. For example, first a solution of binding polymer and solvent is prepared and this solution is mixed with paste containing the colorant to form an ink. It is currently preferred to form inks from binding polymer solutions having a viscosity of about 40,000 cps.

Pad transfer printing is well known in the art (see. For example, U.S. Pat. No. 3,536,386 to Spivack; U.S. Pat. No. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliche according to any methods known to a person skilled in the art, for example, by chemical etching or laser ablation or the like. It is also desirable to clean cliches after use using standard cleaning techniques known to a person skilled in the art, such as, for example, immersion in a solvent, sonication, or mechanical abrasion.

It is understood that either the anterior (convex) or posterior (concave) surfaces of the lens may be printed, but printing the anterior surface is presently preferred.

Printing the lens using an inkjet printing process is described in published US Patent Application Nos. 2001/0050753, 2001/0085934, 2003/0119943, and 2003/0184710, herein incorporated by references in their entireties.

In accordance with a preferred embodiment, a colored contact lens may further comprise a clear coating covering at least the colored central zone of a lens. A clear coating can be formed on the colored central zone by applying a layer of a clear polymerizable solution free of any colorant onto the lens surface with color prints and then polymerizing the layer of clear polymerizable solution. A clear coat may minimize leaching of a colorant and may enhance wearer's comfort.

Alternatively, a colored contact lens of the invention can be made according to a print-on-mold process similar to those described in U.S. Pat. No. 5,034,166 to Rawlings et al. (herein incorporated by reference). An ink can be applied first on the molding surface of one or both mold portions by using pad transfer printing (or pad printing) or inkjet printing to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

Optionally, a transferable coating can be applied to a molding surface of a mold before applying the ink by pad transfer printing. A transfer coating is intended to describe a coating which can be detached from a molding surface of a mold and become integral with the body of a contact lens molded in the mold. A transferable coating can be applied to a molding surface of mold by any suitable techniques, such as, for example, spraying, printing, swabbing, or dipping. A transferable coating can be prepared from a solution comprising polymerizable components and free of any colorants. For example, a transferable coating with substantially uniform thickness (less than 200 microns) can be prepared by spraying a molding surface with a solution having the composition (without colorant) of an ink to be used or a solution of prepolymer or a lens-forming material to be used. This transferable coating can optionally be dried or cured to form a transferable clear film (without any pigment but optionally with dyes including reactive dyes). One or more colored patterns can then be printed on this transferable coating or film. By applying a transferable coating before printing, one can make a colored lens in which printed colored patterns are imbedded just below a film derived from the transferable coating. Such lens may be more comfortable for wearing and have much less susceptibility to colorant leaching out of the colored lens.

After printing an ink of the invention on a molding surface of a mold, the printed ink can be cured by UV or other actinic radiation to form a colored film in accordance with the invention. It is desirable that the printed ink is cured actinically to an extent to minimize loss of pattern definition of the colored coat resulted from subsequent filling of a lens-forming material.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberqer et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Any lens-forming materials can be used in the invention and is not presently considered a critical part of this aspect of the invention. Lens forming materials that are suitable in the fabrication of contact lenses are illustrated by numerous issued US patents and familiar to those skilled in the art. Preferred lens-forming materials are capable of forming hydrogels. A lens-forming material can comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention.

A preferred group of lens-forming materials are prepolymers which are water-soluble and/or meltable as described above. It would be advantageous that a lens-forming material comprises primarily one or more prepolymers which are preferably in a substantially pure form (e.g., purified by ultrafiltration). Therefore, after crosslinking/polymerizing by actinic radiation, a contact lens may require practically no more subsequent purification, such as complicated extraction of unpolymerized constituents. Furthermore, crosslinking/polymerizing may take place solvent-free or in aqueous solution, so that a subsequent solvent exchange or the hydration step is not necessary.

A person skilled in the art will known well how to actinically or thermally cure the lens-forming material within the lens-forming cavity to form the contact lens.

In a preferred embodiment, where a lens-forming material is a solution, solvent-free liquid, or melt of one or more prepolymers optionally in presence of other components, reusable molds are used and the lens-forming material is cured actinically under a spatial limitation of actinic radiation to form a colored contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned and dried rapidly to effectively remove the uncrosslinked prepolymer and other residues, using water or a suitable solvent. Reusable molds can also be made of Topas® COC grade 8007-S10 (clear amorphous copolymer of ethylene and norbornene) from Ticona GmbH of Frankfurt, Germany and Summit, N.J. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. Nos. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

It should be understood that an ink of the invention should have a good transferability of the colored coat from a mold to a contact lens and a good adhesion to the molded lens. The resultant colored contact lens is essentially smooth and continuous on the surface containing the color film.

The good transferability and adhesion may be resulted largely from interpenetrating network formation during curing of the lens-forming material in the mold. Without limiting this invention to any particular mechanism or theory, it is believed that the ink binders of the invention can form interpenetrating networks (IPN's) with the lens material of a hydrogel lens. Adhesion of an ink of the invention to the lens by IPN formation does not require the presence of reactive funtional groups in the lens polymer. The lens-forming material is crosslinked in the presence of crosslinked binder polymer in the colored film to form IPNs. It is understood that some (residual) ethylenically unsaturated groups in the binder polymer may not be consumed during curing of the colored coat to form the colored film. These residual ethylenically unsaturated groups may undergo crosslinking reaction to bind the binder polymer to the lens material during the curing of the lens-forming material in the mold.

It is also understood that adhesion between lenses and ink could be enhanced by direct linkage (bond formation) between binder polymer and lens polymer. For example, a binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made be incorporating both nucleophilic and electrophilic functionality into to binder polymer.

In another aspect, the invention encompasses a method for making a colored contact lens. The method comprises the steps of: providing a preformed contact lens; and applying non-opaque colored dots onto a substantially circular central zone of at least one of the anterior and posterior surfaces of the contact lens to form a colored, substantially-circular pattern of non-opaque colored dots, wherein sizes of the dots and/or amounts of space between the dots are varied in a radially-controlled manner so that local colored dot coverage increases in a radial direction from the center to the peripheral edge or a position near the peripheral edge of the central zone.

In a preferred embodiment, the method further comprises printing a dark limbal ring onto the substantially circular central zone, wherein the dark limbal ring is located near the peripheral edge of the central zone and/or surrounding the colored pattern, wherein the limbal ring is comprised of a dark colorant, wherein the limbal ring has an interior peripheral edge and an exterior peripheral edge, wherein the exterior peripheral edge is substantially even, wherein the interior peripheral edge is uneven (or jugged or irregular) or substantially even, and wherein the limbal ring optionally overlaps to some degrees with the pattern of non-opaque colored dots.

In a further aspect, the invention encompasses a method for making a colored contact lens, comprising the steps of: providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces; applying an ink, by using pad-transfer or inkjet printing technique, to onto a substantially circular central zone of at least one of molding surfaces of a lens mold to form a colored coat, wherein the colored coat comprises a colored, substantially-circular pattern of non-opaque colored dots, wherein sizes of the dots and/or amounts of space between the dots are varied in a radially-controlled manner so that local colored dot coverage increases in a radial direction from the center to the peripheral edge or a position near the peripheral edge of the central zone; partially or completely curing the ink printed on the mold to convert the colored coat to a colored film; dispensing a lens-forming material into the lens-forming cavity; and curing the lens-forming material within the lens-forming cavity to form a colored contact lens, whereby the colored film detaches from the molding surface and becomes integral with the body of the contact lens, wherein the colored film becomes part of one of the anterior and posterior surface of the colored contact lens and has a good adhesion to the lens.

Any known suitable lenses made of any lens-forming material can be used to practice this invention. Preferably, hydrogel lenses or silicone-containing hydrogel lenses are used to practice this invention. Examples of preferred lenses include: without limitation, lenses described in Loshaek's U.S. Pat. No. 4,668,240 (incorporated herein by reference in its entirety); lenses prepared from a water-soluble crosslinkable poly(vinyl alcohol) prepolymer as described in U.S. Pat. Nos. 5,583,163 and 6,303,687 (incorporated by reference in their entireties); lenses made from a water-soluble crosslinkable polyurea prepolymer as described in U.S. Pat. No. 6,479,587 (herein incorporated by reference in its entirety) and a co-pending U.S. patent application No. 60/525,100 filed Nov. 25, 2003 entitled "Crosslinkable polyurea prepolymers" (herein incorporated by reference in its entirety); and the like. It is understood that any commercial available lenses, such as, for example, FOCUS DAILIES®, ACUVUE®, etc., can be used to practice this invention.

In a further aspect, the invention provides a colored contact lens comprising a colored central zone, wherein the colored central zone includes a colored, substantially-circular pattern of non-opaque colored dots, wherein all of the colored dots are substantially identical in size and shape, wherein amounts of space between the dots are substantially constant, wherein local colored dot coverage is substantially uniform and has a value from about 5% to about 80%, preferably from about 10% to about 50%, more preferably from about 15% to about 40%.

FIG. 9A illustrates a substantially-circular pattern of dots. Local colored dot coverage is about 50% throughout the central zone (FIG. 9B).

In a still further aspect, the invention provides a method for designing a colored contact lens that enhance an eye color. The method comprises the steps of: generating a matrix of dots arranged to form a substantially-circular shape; adjusting sizes of the dots and/or amounts of space between the dots in a radially-controlled manner so that local colored dot coverage increases in a radial direction from the center to the peripheral edge or a position near the peripheral edge of the substantially-circular shape.

In one embodiment, both the size of the dots and the amounts of space between two dots are varied in a way that the size of each dot increases gradually in a radial direction (i.e., from the center to the edge or a position near the edge of the substantially-circular shape) whereas the amount of space between dots decreases gradually in the same radial direction. For example, the spacing of the center of each dot (or distance between two neighbor dots is fixed and by increasing the sizes of dots as they are farther from the center, the resulting space between the dots becomes smaller.

In a preferred embodiment, the center of each dot is located at one of the intersection points of a grid (a network of evenly-spaced horizontal and vertical imaginary lines).

In another preferred embodiment, the center of each dot is located at one of intersection points of a series of imaginary lines radiating from the center of the substantially-circular shape with a series of imaginary circles concentric with the center of substantially-circular shape and having a fixed increment in radius.

In another embodiment, the size of each dot is substantially constant whereas the amount of space between dots decreases gradually in a radial direction (from the center to the edge or a position near the edge of the substantially-circular shape) by increasing the numbers of dots within one or more areas.

The dots can have any shape, regular or irregular, such as circular, oval, triangular, square, hexagonal, elongated, etc. All of dots can have similar or different shapes. Preferably, all dots have substantially similar shape. More preferably, all dots have circular shapes.

The range of dot sizes is preferably from 0 to about 0.2 mm. The spacing between dots is preferred from 0 to about 0.2 mm.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLE 1

Different colors of green and blue inks are prepared as shown in Table 1. The percentage of each components is by weight.

TABLE 1

| | Composition (% by weight) | | | | | |
|---|---|---|---|---|---|---|
| Ink | Nelfilcon[1] | PCN Blue | PCN green | Surfactant[2] | Na$_2$PO$_4$ | Irgacure ® 2959 |
| BL-1 | 95.7 | 3.0 | 0.0 | 0.1 | 0.2 | 1.0 |
| BL-2 | 93.7 | 5.0 | 0.0 | 0.1 | 0.2 | 1.0 |
| BL-3 | 94.7 | 4.0 | 0.0 | 0.1 | 0.2 | 1.0 |
| GR-4 | 94.7 | 0.0 | 4.0 | 0.1 | 0.2 | 1.0 |
| GR-5 | 95.2 | 0.0 | 3.5 | 0.1 | 0.2 | 1.0 |
| GR-6 | 95.7 | 0.0 | 3.0 | 0.1 | 0.2 | 1.0 |

[1] An aqueous solution of nelfilcon (30% by weight of nelfilcon and 70% by weight of water)
[2] Surfynol ® 420 surfactant These inks are used to print on the glass female mold halves of reusable molds shown in FIGS. 1-9 of U.S. Pat. No. 6,627,124 according to pad transfer printing technique. The male mold halves are made of quartz. The inks are cured under a Hamamatsu lamp with a fiber optic probe and a 297 nm cut-off filter. The light is passed through a condenser (f=22.5 mm), with a distance 40 mm from the condenser to the mold. UVB light greater than 5 mW/cm$^2$ is used for 2 seconds, as measured by a Groebel detector. The intensity is monitored by measuring the aperture of the Hamamatsu lamp.

After curing the printed ink on female mold halves, a nelfilcon solution containing about 30% nelfilcon and 0.1% Irgacure 2959 is dispensed onto the printed female mold halves by using an EFD automatic dispenser (4 bar, 1.2 sec). The female mold halves then mate with corresponding male mold halves and are closed. The nelfilcon is UV cured with a Dr. Groebel lamp, with a 303 nm (50% transmission) cut-off filter installed in the condenser. The molds are opened and resultant colored contact lenses are stored in DI water until use.

Colored contact lenses are examined by imaging under back-lighting conditions to emphasize contrast. Imaging is performed using a parafocal zoom lens (0.7×-4.5×, VZM-450, Edmund Scientific) with a 0.5× supplemental lens. A Sony XC-999 camera connected to a Matrox Meteor 2 frame grabber allowed images to be taken with Archive4Images (A4I) software (Aquinto). The A4A software automatically exports the images to Microsoft Word, which can examined for print quality and resolution.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A colored contact lens, comprising a colored central zone, wherein the colored central zone includes a substantially circular pattern of a color, wherein the substantially-circular colored pattern is composed of colored dots which are transparent or translucent, wherein sizes of the dots and/or amounts of space between the dots are varied in a radially-controlled manner so that local colored dot coverage increases in a radial direction from the center to the peripheral edge or a position near the peripheral edge of the substantially-circular pattern, wherein the substantially-circular colored pattern has a size sufficient to cover the most or the whole iris of an eye to make subtle changes to the color of the eye and enhance the color of the eye.

2. The colored contact lens of claim 1, further comprising a substantially-annular, non-opaque peripheral zone surrounding the colored central zone.

3. The colored contact lens of claim 2, wherein both the sizes of the dots and the amounts of space between two dots are varied in a way that the size of each dot increases gradually whereas the amount of space between dots decreases gradually in the radial direction.

4. The colored contact lens of claim 2, wherein the size of each dot is substantially constant whereas the amount of space between dots decreases gradually in the radial direction.

5. The colored contact lens of claim 2, wherein the colored central zone has a profile of local colored dot coverage which has a substantially rotational-symmetry and is defined by at least one mathematical function.

6. The colored contact lens of claim 5, wherein the at least one mathematical function is selected from group consisting of conic functions, quadric functions, polynomials of any degree, exponential functions, trigonometric functions, hyperbolic functions, rational functions, Fourier series, and wavelets.

7. The colored contact lens of claim 5, wherein the profile of local colored dot coverage is defined by at least one of equations (2), (3) and (4) or combinations thereof $$C(r) = b_0 + a_0 \cdot \sin\left(\frac{r}{2R}\pi\right) \quad (2)$$

$$C(r) = \sum c_j \left(\frac{r}{R}\right)^{(l+j)} \quad (3)$$

$$\begin{cases} C(r) = b_1 + k_1 \frac{r}{R} & 0 \le r < r_1 \\ C(r) = b_2 + k_2 \frac{r}{R} & r_1 \le r < r_2 \\ \vdots \\ C(r) = b_i + k_i \frac{r}{R} & r_{i-1} \le r < r_i \\ \vdots \end{cases} \quad (4)$$

in which C(r) is a local colored dot coverage at a distance of r from the center; $a_0$, $b_i$, $c_j$, and $k_i$ are coefficients; and R is the radius of the substantially-circular pattern.

8. The colored contact lens of claim 2, wherein the colored central zone has a profile of local colored dot coverage which has a substantially axial symmetry of an angle.

9. The colored contact lens of claim 2, wherein the colored central zone comprises a small central area where there are no colored dots.

10. The colored contact lens of claim 9, wherein the small central area is substantially circular in shape and has a diameter of from about 0.1 mm to about 5.0 mm.

11. The colored contact lens of claim 10, wherein the small central area has a diameter of from about 0.5 mm to 1.5 mm.

12. The colored contact lens of claim 10, wherein the small central area has a diameter of from about 0.8 mm to about 1.2 mm.

13. The colored contact lens of claim 2, wherein all of the colored dots are similar in shape.

14. The colored contact lens of claim 13, wherein all of the colored dots are substantially circular.

15. The colored contact lens of claim 2, wherein the colored central zone further comprises a dark limbal ring located near the peripheral edge of the colored central zone, wherein the limbal ring is comprised of a dark colorant and has a substantially even exterior peripheral edge and a jagged or substantially-even interior peripheral edge.

16. The colored contact lens of claim 15, wherein the limbal ring overlaps to some degrees with the substantially-circular pattern.

17. The colored contact lens of claim 15, wherein the dark limbal ring is composed of pigmented areas in black.

18. The colored contact lens of claim 2, wherein the colored central zone further comprises a mark embedded in the colored pattern so that the mark is noticeable to a wearer before wearing the colored lens whereas the mark is unnoticeable to an ordinary viewer when worn by a wearer, wherein the mark is selected from the group consisting of an inversion mark, a rotation mark, a toric mark, SKU, UPC codes, and combinations thereof.

19. The colored contact lens of claim 18, wherein the mark is opaque.

20. The colored contact lens of claim 18, wherein the mark is a positive mark prepared by increasing local colored dot coverage.

21. The colored contact lens of claim 18, wherein the mark is a negative mark prepared by deceasing local colored dot coverage.

22. The colored contact lens of claim 2, wherein at least the colored central zone is covered by a clear coat.

23. The colored contact lens of claim 2, wherein the space between the dots is differently-colored.

24. The colored contact lens of claim 23, wherein the space has a luminance or value higher than that of the colored dots.

25. The colored contact lens of claim 2, wherein the space between the dots is lightly-tinted.

26. The colored contact lens of claim 2, wherein the space between the dots is substantially clear.

27. A method for making a colored contact lens, comprising the steps of:
(a) providing a preformed contact lens; and
(b) applying non-opaque colored dots of a color onto a substantially circular central zone of at least one of the anterior and posterior surfaces of the contact lens to form a substantially-circular colored pattern, wherein sizes of the dots and/or amounts of space between the dots are varied in a radially-controlled manner so that local colored dot coverage increases in a radial direction from the center to the peripheral edge or a position near the peripheral edge of the substantially-circular pattern, wherein the substantially circular colored pattern applied thereon has a size sufficient to cover the most or the whole iris of an eye wearing the lens to make subtle changes to the color of the eye and enhance the color of the eye.

28. The method of claim 27, wherein the step of applying is carried out according to a pad-transfer or inkjet printing process.

29. The method of claim 27, wherein the method further comprises printing a dark limbal ring onto the substantially circular central zone, wherein the dark limbal ring is located near the peripheral edge of the central zone, wherein the limbal ring is comprised of a dark colorant, wherein the limbal ring has a jagged or substantially-even interior peripheral edge and a substantially even exterior peripheral edge.

30. The method of claim 29, wherein the limbal ring overlaps to some degrees with the substantially circular pattern.

31. The method of claim 27, wherein the substantially circular pattern includes a mark embedded therein so that the mark is noticeable to a wearer before wearing the colored lens whereas the mark is unnoticeable to an ordinary viewer when worn by a wearer, wherein the mark is selected from the group consisting of an inversion mark, a rotation mark, a toric mark, SKU, UPC codes, and combinations thereof.

32. The method of claim 31, wherein the mark is a positive mark obtained by increasing local colored dot coverage around a position.

33. The method of claim 31, wherein the mark is a negative mark obtained by decreasing local colored dot coverage around a position.

34. The method of claim 27, wherein the method further comprises printing an opaque mark which is hidden in the substantially circular pattern of non-opaque colored dots so that the mark is noticeable to a wearer before wearing the colored lens whereas the mark is unnoticeable to an ordinary viewer when worn by a wearer, wherein the mark is selected from the group consisting of an inversion mark, a rotation mark, a toric mark, SKU, UPC codes, and combinations thereof.

35. The method of claim 27, wherein the method further comprises forming a clear coat covering at least the substantially circular central zone.

36. A method for making a colored contact lens, comprising the steps of:
(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
(b) applying an ink, by using pad-transfer or inkjet printing technique, to onto a substantially circular central zone of at least one of molding surfaces of a lens mold to form a colored coat, wherein the colored coat comprises a substantially-circular colored pattern of a color, wherein the substantially-circular colored pattern is composed of colored dots which are transparent or translucent, wherein sizes of the colored dots and/or amounts of space between the colored dots are varied in a radially-controlled manner so that local colored dot coverage increases in a radial direction from the center to the peripheral edge or a position near the peripheral edge of the substantially-circular colored pattern;
(c) partially or completely curing the ink printed on the mold to convert the colored coat to a colored film; dispensing a lens-forming material into the lens-forming cavity; and
(d) curing the lens-forming material within the lens-forming cavity to form a colored contact lens, whereby the colored film with the substantially circular colored pattern detaches from the molding surface and becomes integral with the body of the contact lens, wherein the colored film becomes part of one of the anterior and posterior surface of the colored contact lens and has a good adhesion to the lens, wherein the substantially circular colored pattern is located in the central zone of the anterior or posterior surface of the lens and has a size sufficient to cover the most or the whole iris of an eye wearing the lens to make subtle changes to the color of the eye and enhance the color of the eye.

37. The method of claim 36, wherein the method further comprises printing a dark limbal ring onto the substantially circular central zone, wherein the dark limbal ring is located near the peripheral edge of the central zone, wherein the limbal ring is comprised of a dark colorant, wherein the limbal ring has a jagged or substantially-even interior peripheral edge and a substantially even exterior peripheral edge.

38. The method of claim 36, wherein the limbal ring overlaps to some degrees with the substantially circular pattern of non-opaque colored dots.

39. The method of claim 36, wherein the substantially circular pattern includes a mark embedded therein so that the mark is noticeable to a wearer before wearing the colored lens whereas the mark is unnoticeable to an ordinary viewer when worn by a wearer, wherein the mark is selected from the group consisting of an inversion mark, a rotation mark, a toric mark, SKU, UPC codes, and combinations thereof.

40. The method of claim 39, wherein the mark is a positive mark obtained by increasing local colored dot coverage around a position.

41. The method of claim 36, wherein the method further comprises printing an opaque mark which is hidden in the substantially circular pattern of non-opaque colored dots so that the mark is noticeable to a wearer before wearing the colored lens whereas the mark is unnoticeable to an ordinary viewer when worn by a wearer, wherein the mark is selected from the group consisting of an inversion mark, a rotation mark, a toric mark, SKU, UPC codes, and combinations thereof.

42. The method of claim 36, wherein a transferable clear coating is applied onto the molding surface of the mold before the step (b).

43. The method of claim 42, wherein the transferable coating is prepared from a polymerizable fluid material free of any colorant.

44. The method of claim 36, wherein the colored coat is applied onto a molding surface defining the anterior surface of a contact lens to be made.

45. A colored contact lens, comprising a colored central zone, wherein the colored central zone includes a colored, substantially-circular pattern of non-opaque colored dots, wherein all of the colored dots are substantially identical in size and shape, wherein amounts of space between the dots are substantially constant, wherein local colored dot coverage is substantially uniform and has a value from about 5% to about 80%.

46. The colored contact lens of claim 45, wherein local colored dot coverage is substantially uniform and has a value from about 10% to about 50%.

47. The colored contact lens of claim 45, wherein local colored dot coverage is substantially uniform and has a value from about 15% to about 40%.

48. A method for designing a colored contact lens that enhance an eye color, comprising the steps of:
(a) generating a matrix of dots arranged to form a substantially-circular colored shape which has a size sufficient large to cover the most or the whole iris of an eye and includes a small central clear area free of colored dots, wherein the central clear area is substantially circular in shape having a diameter of from about 0.5 mm to 1.5 mm; and
(b) adjusting sizes of the dots and/or amounts of space between the dots in a radially-controlled manner so that local colored dot coverage increases in a radial direction from the edge of the central clear area to the peripheral edge or a position near the peripheral edge of the substantially-circular colored shape.

49. The method of claim 48, wherein both the size of the dots and the amounts of space between two dots are varied in a way that the size of each dot increases gradually in a radial direction from the center to the edge or a position near the edge of the substantially-circular shape whereas the amount of space between dots decreases gradually in the same radial direction.

50. The method of claim 49, wherein the center of each dot is located at one of the intersection points of a grid (a network of evenly-spaced horizontal and vertical imaginary lines).

51. The method of claim 49, wherein the center of each dot is located at one of intersection points of a series of imaginary lines radiating from the center of the substantially-circular shape with a series of imaginary circles concentric with the center of substantially-circular shape and having a fixed increment in radius.

52. The method of claim 48, wherein the size of each dot is substantially constant whereas the amount of space between dots decreases gradually in a radial direction (from the center to the edge or a position near the edge of the substantially-circular shape) by increasing the numbers of dots within one or more areas.

* * * * *